INVENTOR.
LOUIS E. BARBEAU, DECEASED
BY JEANNETTE B. BARBEAU, ADMX.
BY
Charles L. Lovercheck
attorney Nov. 6, 1962 L. E. BARBEAU 3,061,849
METHOD AND APPARATUS FOR CHANGING THE RELATIVE ROTATING
SPEEDS OF A THREADING TOOL AND WORK TO
EFFECT DISENGAGEMENT
Filed June 25, 1958 2 Sheets-Sheet 2
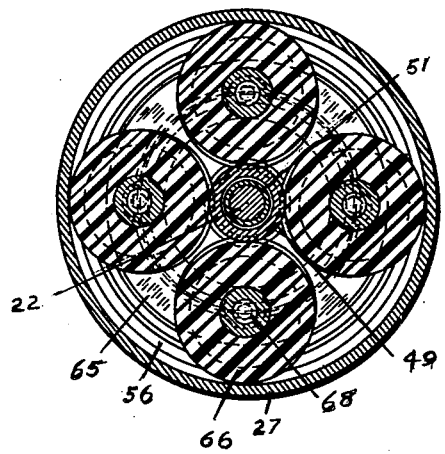
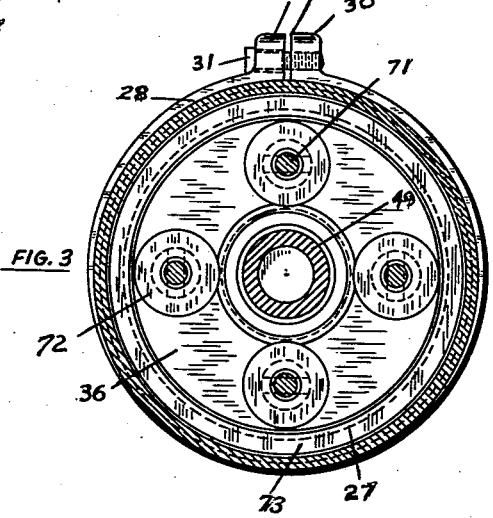
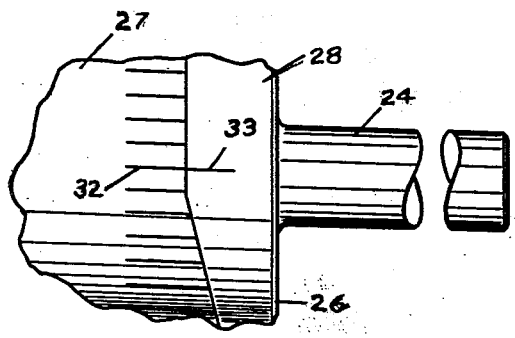
INVENTOR
LOUIS E. BARBEAU, DECEASED
BY JEANNETTE B. BARBEAU, ADMX.
BY
Charles L. Lauchak
attorney United States Patent Office 3,061,849
Patented Nov. 6, 1962

3,061,849
METHOD AND APPARATUS FOR CHANGING THE RELATIVE ROTATING SPEEDS OF A THREADING TOOL AND WORK TO EFFECT DISENGAGEMENT
Louis E. Barbeau, deceased, late of 47 Main St., Silver Creek, N.Y., by Jeannette B. Barbeau, administratrix, Silver Creek, N.Y.
Filed June 25, 1958, Ser. No. 744,614
33 Claims. (Cl. 10—136)

This invention relates to a method and apparatus for performing various machining operations and, more particularly, to a method and apparatus for effecting, threading, gauging, and any other operations on an article or workpiece where a threading-unthreading operation is involved.

An object of the invention is the provision of a novel method and apparatus for effecting a machining operation such as internal tapping, external threading, or the like, upon a rotating workpiece by a rotating tool or, vice versa, a machining operation where the workpiece is rotated and the threading tool is rotated by power, the energy for rotating the tool being derived from the workpiece.

Another object of the invention is the provision of a novel method and apparatus for effecting a machining operation such as tapping, threading, or the like, upon a rotating workpiece wherein a tool, supported for rotation, is rotated by its engagement with the rotating workpiece, the rotation of the tool being retarded so that the tool rotates relative to the workpiece, thereby effecting a machining operation thereon by energy derived solely from the rotation of the workpiece.

A further object of this invention is the provision of a novel method and apparatus for effecting a machining operation such as tapping, threading, or the like, upon a rotating workpiece wherein the tool is rotated relative to the workpiece and caused to perform the machining operation by energy derived from the rotation of the workpiece, a portion of the energy being transmitted by the tool to an energy storing device and the stored energy being returned to the tool to effect withdrawal of the tool from the workpiece at the end of the machining operation.

A more specific object of the invention is the provision of a novel method and apparatus for effecting a machining operation such as tapping, threading, or the like, upon a rotating workpiece wherein the tool is operatively connected to an inertia member in a manner such that engagement of the tool with the rotating workpiece causes rotation of the tool and inertia member in the same direction as the workpiece, a portion of the rotational energy imparted to the tool being stored as kinetic energy of the inertia member so that the tool rotates at a slower speed than the workpiece during the machining operation, at least a portion of the stored energy being returned to the tool to rotate the tool faster than the workpiece, thereby disengaging the tool from the workpiece.

A still more specific object of this invention is the provision of a novel attachment for a machine tool adapted to effect a tapping or similar operation upon a rotatable workpiece, the attachment comprising an inertia member supported for rotation and operatively connected with a rotatable tool by an epicyclic speed change mechanism whereby engagement of the tool with the work causes the tool to be initially rotated at a slower speed than the work and the inertia member to be brought up to a speed of rotation faster than that of the work, means being provided to effect a direct connection of the tool and the inertia member through the speed change mechanism when the machining operation is completed, thereby causing the tool to rotate faster than the work.

Still another object of the invention is to provide in a turret lathe or similar machine having a power driven work carrying rotary spindle, a method and apparatus to enable internal tapping or external threading to be performed in or on the end of a continuously rotating workpiece, using a solid threading tool, i.e., a non-collapsing tap or a non-opening die, followed by unscrewing and disengaging the tool from the workpiece, the entire operation being accomplished without at any time slowing, stopping, or reversing the rotation of the workpiece.

Still a further object of the invention is to provide a method and apparatus, on a turret lathe or similar machine, of threading as described capable of doing such threading while the workpiece is rotating at relatively high speed, at far greater speed than is now considered suitable for threading. Particularly, threading heretofore has required speeds considerably reduced. This permits threading as described to be done while the workpiece is rotating at speeds equal to or substantially equivalent to the speeds commonly used or at the same speeds used for other machining operations.

It is still another object of the invention to provide, in a turret lathe or similar machine having an indexable turret, a rotatable, rotatably mounted threading tool employing the well-known principle of relative rotatation or relative rotational speeds between workpiece and tool to effect both threading and unthreading and differential rotation, such tool being mounted on the conventional bed turret in the usual tool location in common with other turret tools. Such tool requires rotational resistance to be provided to effect threading and requires extra rotational power to be provided to effect unthreading. A rotatable, rotation resisted free rotating, rotation powered threading tool with the ability to rotate, to be neutral, and to be rotated is provided.

Yet another object of the invention is to provide for use on a machine tool such as a turret lathe having a conventional style of base bed, turret slide base, turret slide, and indexable turret, which, by reason of the combination of motions is difficult or impossible to supply with rotary power at any of the usual tool stations on the turret or on any other machine tool having similar turret construction wherein the same difficulty is encountered, an apparatus cooperating with the tool described and serving to provide it with the rotational resistance required for threading and the rotational power required for unthreading. The apparatus either can be built into the construction of new machines or can be added as an auxiliary to the turret mounted in, upon, above, or adjacent to the turret. The apparatus is a compact integrated unit mechanism which is rotatably supporting, holding, and cooperating with the tool and capable of exerting upon the tool the combination of rotary resistance and rotary power required for threading and unthreading. It is adapted to receive rotary power from and to impart rotary power to the tool and empowers the tool threading and removal. Such a mechanism is isolated in the sense that it is unconnected to and does not require any usual source of power or any usual power transmission, the mechanism requiring and receiving no power whatever other than rotary reactive power received through the tool from the rotation of the workpiece and, therefore, freely able to be carried around with the indexing and other motions of the turret.

Still yet another object of this invention is to provide an attachment for a machine tool for threading a blind hole completely to the bottom thereof wherein the work holder on the machine rotates and the attachment is held stationary.

Still yet a further object of the invention is to provide a threading-unthreading attachment for a machine tool wherein the attachment and work rotate relative to each other and the attachment has means thereon to thread to a predetermined depth.

All of the above objects are achieved in this invention. Threading is accomplished by permitting the tool to rotate with and in the same direction as the work but at a slower speed by restraining it from rotating as fast as the work until the threading has been accomplished.

Unthreading or unscrewing is accomplished by rotating the tool with and in the same direction as the work but at a faster speed by urging it faster than the work until complete disengagement has been accomplished. Invariably, to retard rotation of the tool below work speed, resistance is employed. Further, invariably, to accelerate rotation of the tool above work speed, rotary power is imparted to the tool.

The whole function may be stated thus: Upon bringing the tool into engagement with a continuously rotating workpiece to restrain rotation of the tool so that it threads into the workpiece and upon drawing the tool away from the workpiece to energize and quicken the tool so that it unscrews and disengages from the workpiece, a totally new kind of resistance and a totally new kind of power are employed. The essence of this new concept is the provision of an apparatus cooperating with the tool which is able to absorb, store, and discharge rotary power. This is done by providing a power storing means which may take one of several forms.

In general, the operation of the apparatus is as follows: Having a power driven, continuously rotating workpiece prepared to receive the threading tool, upon bringing the tool into engagement with the workpiece, the tool, because of the resistance of the energy storing means, threads into the work. At the same time, the tool has absorbed and received reactionary power from the rotating workpiece and the rotating tool serves to transmit this power through itself backward to the energy storing means. Thus, a considerable body of power may be stored, during threading and immediately thereafter, within a very brief time. Upon or soon after completion of the threading phase of the operation, a change in the internal relationship of the apparatus is effected by drawing the apparatus away from the workpiece whereupon the original relationship is disconnected and the new relationship causes the stored energy to be discharged from the energy storing means back to the tool. This serves to energize, urge, and propel the rotation of the tool in the same direction as that of the workpiece but at a faster rotational speed so that the tool is unscrewed and disengaged from the workpiece.

The invention further resides in certain novel steps of procedure, features of construction and combination and arrangement of parts of the apparatus, and further objects and advantages thereof will be apparent to those skilled in the art to which it pertains from the following description of the present preferred embodiment thereof described with reference to the accompanying drawings, in which:

FIG. 2 is a transverse sectional view taken substantially on section line 2—2 of FIG. 1 and viewed as indicated by the arrows;

FIG. 3 is a transverse sectional view taken substantially on section line 3—3 of FIG. 1 and viewed as indicated by the arrows; and FIG. 4 is a fragmentary side elevational view of a portion of the housing for the apparatus illustrating the calibrations employed in adjusting the apparatus for use with different types of work and/or taps of different sizes.

Figure 1:
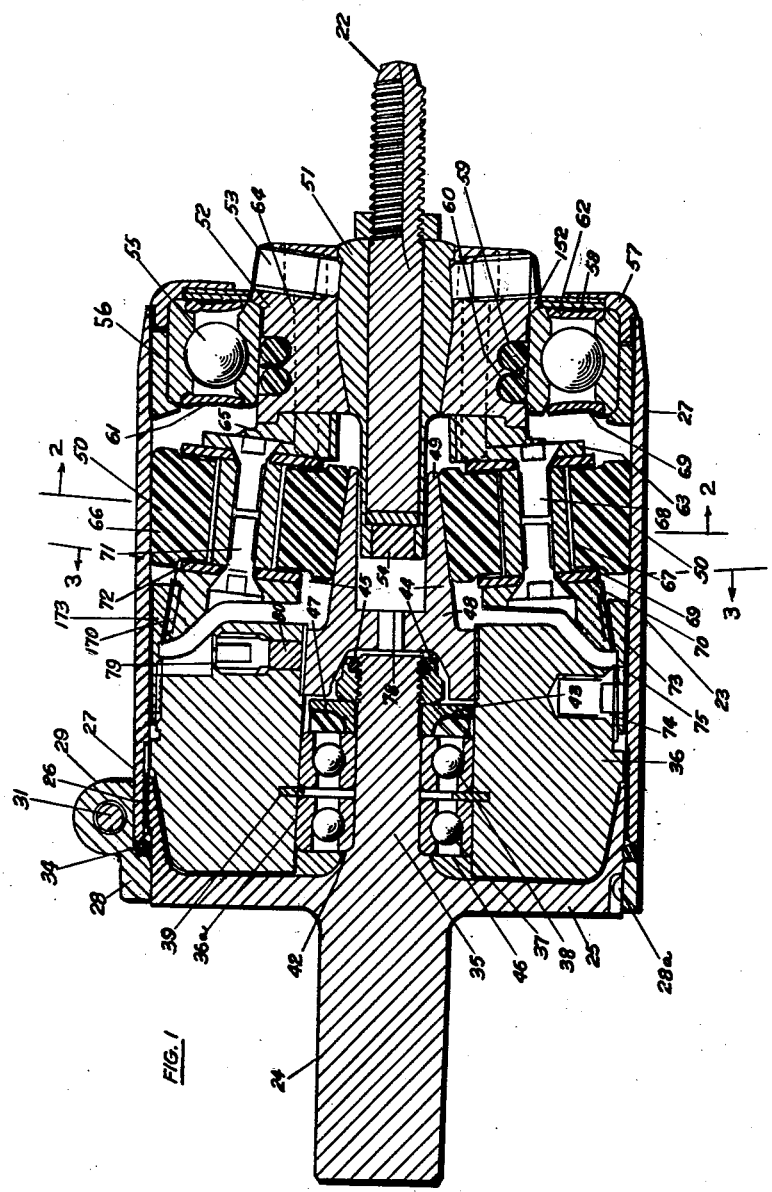
FIG. 1 is a longitudinal sectional view, with certain parts in elevation, showing the present preferred embodiment of an apparatus embodying the invention detached from a turret lathe, the apparatus being shown with a tap positioned therein.

In accordance with this invention, a rotatable tool is employed to effect a machining operation upon a rotating piece of work, the energy for rotating the tool being derived from the work through the interengagement of the tool with the work, the rotation of the tool being partially resisted or retarded so that it rotates at a slower speed than the work, thereby effecting the machining operation. The rotational energy imparted to the tool and not utilized in rotating the tool due to the partial retardation of its rotation during the machining operation is not dissipated but is stored and returned to the tool after the machining operation is completed to effect, or assist, disengagement of the tool from the work.

These basic principles of the invention may be employed with a variety of different types of apparatus to perform various machining operations, especially, on small lathes and hand screw machines where the turret cannot be driven because of the necessity of rotating the turret from station to station; however, for the purpose of clarity and brevity of description, the method and an apparatus for effecting the method will be described with reference to use in effecting a tapping operation upon the workpiece, the workpiece being suitably prepared to receive the tool. It is understood, however, that other machining operations involving screwing-unscrewing in either right or left hand directions may likewise be performed by the method and apparatus of the invention and the latter is by no means contemplated to be limited to effect a tapping operation, an example of which is disclosed.

The method of tapping an opening in a workpiece in accordance with this invention is effected by supporting the work for rotation and rotating the work by a suitable source of power. The tap employed is rotatably mounted and the work and tap are engaged by relatively substantial axial movement therebetween. This causes the tap to be rotated by and in the same direction as the work, the speed of rotation of the tap being less, however, than that of the work so that relative rotation occurs therebetween. This retardation of the rotation of the tap is effected by storing a portion of the rotational energy applied to the tap as, for example, by means of an inertia member operatively connected with the tap. Therefore, the tap, due to the relative rotation between it and the work, threads the opening in the work as an axial feeding movement therebetween is effected. When the tapping operation has been completed, the rotational energy stored in the inertia member is returned to the tap to effect rotation of the tap at a higher speed than that of the work with the result that the tap unthreads itself from the work.

The apparatus for effecting the above mentioned steps of procedure may be variously constructed and arranged. For example, the threader may be supported in the chuck of a drill press and rotated bodily by the power means therefor, the work being supported stationary. Another example is that the threader could be held in and rotated by the spindle of a turret lathe or hand screw machine and the work held stationary in one or more turret stations. This would be useful in the case of non-symmetrical or eccentric pieces which cannot be inserted in a constant rotating holding collet.

The details of apparatus 23 for supporting the tap and enabling the tap to perform its operation upon the workpiece will best be understood from a consideration of FIGS. 1, 2, and 3. As shown in FIG. 1, the inner end of a cylindrical portion or shaft 24 of the apparatus 23 merges with an integral, substantially disk like flange portion 25. The outer edge of the flange portion 25 has a longitudinally extending, annular flange portion 26. At least a portion of the external surface of the flange portion 26 is externally threaded. A substantially cylindrical hollow case or housing member 27 constitutes the principal portion of the housing for the apparatus 23. The member 27 is internally threaded at each end and threaded for a considerable distance at the end adjacent the flange portion 26 and it is threadably engaged with the threads on the flange portion 26. The case 27 may be moved axially relative to the portion 26 by threading the case 27 along the portion 26 different distances for a purpose hereinafter mentioned, the parts being held in any desired adjusted position by a clamp ring 28.

The clamp ring 28 is of a "garter" type and is split at 128 and the portions thereof adjacent the opening thus provided have integral members 29 and 30 which may be drawn toward each other by a clamping screw 31 of a hexagonal socket type passing through one of the ears and threadably engaged in the other. The ring 28 is preferably not of uniform width throughout but has its lower portion thinner than the portion adjacent the ears, the thicker portion constituting approximately one-half the total circumference of the ring 28 and being of sufficient width to overlie a portion of the case 27. The wider portion is counterbored so that it engages the case 27. The thinner portion of the clamp ring 28 is in its free position when the screw is unloosened.

The clamp ring 28 is a slip fit on the flange portion 26 and is in engagement with the case 27. Hence, the clamp ring 28 not only serves to retain the casing member 27 and the flange portion 26 in adjusted positions relative to each other but the inner edge of the thinner portion and the shoulder of the counterbored portion of the ring 28 provide an abutment for an O-ring packing means 34.

Suitable means are provided to indicate the adjusted position of the case 27 relative to the flange portion 26. This means may, for example, comprise a plurality of longitudinally extending grooves or calibration marks 32 spaced about the periphery of the case 27 adjacent the rear end thereof and adapted to be successively aligned with a stationary indicium on the clamp ring 28. This stationary indicium may, for example, comprise a mark or groove 33 upon a portion of the clamp ring 28 or may simply be the median of the space between the members 29 and 30. Preferably, suitable packing means 34 such as a ring of neoprene or the like is disposed between the adjacent portions of the ends of the case 27 and of the clamp ring 28 to provide a fluid tight seal at this point. Rotation of the clamp ring 28 relative to the flange 26 is prevented by a projection 28a on the inner periphery of the ring 28 received in a groove or slot in the flange 26.

The inner face of the flange or disk portion 25 is provided with a cylindrical, centrally disposed bearing support 35 which, in the present embodiment, is shown as integral with the disk portion 25. Upon this bearing support, an inertia member 36 is rotatably mounted by means of anti-friction bearings 37 and 38. The inertia member 36 is formed as an annular member of substantial cross section and is preferably constructed as one integral piece from a material having a high density for use with medium sized tools. Steel is a suitable material but for heavy duty work and for use with large sized tools, a material such as sintered tungsten or the like is suitable so that the member 36 will have a high moment of inertia.

Space from turret hole to the top of slide has a distinct bearing. Some small, fast turret lathes and hand screw machines have a clearance of one and one-half inches from the center of the hole to the top of the slide. Therefore, for these machines, the threader diameter is restricted to three inches. In this, a steel rotor can be used for very small taps and the tungsten rotor for slightly larger ones. On larger turret lathes where the clearance over the turret slide is greater, the threader can be of a larger diameter and, again, the rotor can be steel, tungsten, or even lead, according to the size of tool to be used.

The bearings 37 and 38 of the inertia member 36 are held in place in a bore 36a by means of a relatively narrow, inner peripheral groove intermediate the ends of the bore in which groove a snap ring 39 is disposed. The snap ring 39 may be of the conventional split ring type and has a portion of reduced width substantially diametrically opposite the slit or opening therein. When the snap ring 39 is located within the slot of the bore, it is allowed to expand and seat therein, the depth of the slot being such relative to the width of the snap ring 39 that a portion of the snap ring 39 extends radially inwardly of the bore of the inertia member 36 as shown in FIG. 1.

The anti-friction bearings 37 and 38 are inserted in either end of the bore of the inertia member 36 so that their outer races engage the snap ring 39. The assembly is mounted upon the support 35 by simply slipping the inner races of the bearings upon the cylindrical surface of the support 35 until the inner race of the bearing 37 engages an integral shoulder 42 of the bearing support 35. The bearings 37 and 38 and the inertia member 36 are retained in this position by means of a collar 43 engaging the side of the inner race of the bearing 38 and retained in place by a lock nut 44 screwed upon the threaded outer end of the support 35. The lock nut 44 is of a well known construction and includes a resilient material 45 such as fiber or plastic which engages the threads on the support 35 to lock the nut 44 in place. During assembly of the inertia member 36, packings such as packings 46 and 47 may be interposed between the bearing 37 and the flange portion 25 and between the bearing 38 and the collar 43, if desired, to retain a lubricant in the bearings 37 and 38.

The right hand portion of the bore in the inertia member 36, as viewed in FIG. 1, is threaded and has a clutch hub member 48 screwed thereinto. The clutch hub member 48 has an axially projecting nose portion 49 hollow frusto-conical in shape. The nose portion 49 of the member 48 forms one member of an epicyclic speed change mechanism generally designated 50 which is connected with a means for rotatably supporting a tool such as tap 22. The tool supporting means comprises a collet 51 supported in a substantially annular tool head 52, the collet 51 preferably having a tubular extension freely received within the bore of the nose portion 49 of the hub member 48. The tool head 52 is provided with a plurality of radially extending socket set screws 53, the inner ends of which press upon the usual resilient jaws of the collet 51 to effect compression of the collet 51 into gripping engagement with the shank of the tap 22 inserted therein. If desired, the tubular extension of the collet 51 may have a non-circular shaped portion, for example, square, adjacent the inner end thereof for reception of a corresponding square portion of the tap 22. This end of the collet 51 is preferably closed by a plug 54 of suitable material to prevent the passage of fluid.

The tool head 52 and, hence, the collet 51, is rotatably supported in the case 27 by an anti-friction bearing 55, the outer race of which is supported in a mounting ring 56 received in the counterbored outer end of the case 27. The reduced outer peripheral portion of the tool head 52 is freely slidable in the inner race of the bearing so that an integral shoulder 152 on the tool head 52 adjacent the screws 53 comes against the inner race of the bearing to stop the backward or inner movement of the tool head 52.

The bearing 55 is held in place by a retainer ring 57 which has an outer peripheral threaded portion screwed into the inner peripheral threaded outer end of the case 27, the ring 57 having a radially inwardly directed flange engaging the outer race of the bearing 55. The inwardly directed flange of the ring 57 is countersunk on its inner surface to provide an annular recess for receiving an annular sealing washer 58 which may be formed of neoprene, plastic, or other suitable material and is provided to render a substantially fluid tight seal for the bearing 55 to keep coolant and other liquid out of the bearing 55. Therefore, the tap 22, the collet 51, the tool head 52, and the assembly connected thereto are free to slide forwardly or rearwardly in the inner race of the bearing 55.

A seal against leakage of fluid between the tool head 52 and the inner race of the bearing 55 is preferably provided by a pair of packing rings 59 and 60 formed of neoprene or like material and having a substantially circular cross section, the rings 59 and 60 being received in suitable annular recesses in the tool head 52, the width of the tool head 52 being preferably slightly less than the cross sectional diameter of the material of the rings 59 and 60 so that the rings 59 and 60 are compressed slightly when inserted into the grooves and cannot move appreciably therein. The outer peripheries of the rings 59 and 60 initially extend slightly beyond the adjacent outer surface of the tool head 52 but are compressed by assembly thereon of the inner race of the bearing 55. In addition to the sealing means mentioned, the bearing 55 is itself provided with conventional sealing rings such as rings 61 and 62 which extend between the inner and outer races of the bearing 55 at either side thereof.

Connected with the tool head 52 is a head plate 63 which has an enlarged central opening. A planet carrier is fixed to the head 52 by a plurality of screws 64 extending through spaced holes in the tool head 52 and threadably received in the planet carrier. The head plate 63 has an outwardly directed integral flange portion 65 the surface of which, opposite to the tool head 52, slopes from the center outwardly and toward the tool head 52. The flange portion 65 rotatably supports a plurality of planetary roller members 66 of the epicyclic gearing mechanism 50 for cooperation with the nose portion 49 of the hub member 48 and with the inner peripheral surface of the case 27.

In the illustrated embodiment, the planetary roller members 66 are four in number formed by frusto-conically shaped friction rollers. The rollers 66 are supported on the flange portion 65 so that their axes are spaced substantially ninety degrees from each other. When the tap 22 engages the work, the rollers 66 contact the nose portion 49 and exert equal pressure on the inside of the case 27. The axes of the rollers 66 are set at an angle to the axis of the case 27. The angle is one-half the angle included between the axis of the case 27 and a line drawn through the outside of the nose portion 49 in the same plane as the axis of the casing 27. The inside diameter of the bores through the rollers 66 is of considerably greater diameter than the outside diameter of axles 67. This allows the rollers 66 to be pushed out radially of the nose portion 49 when the tap pushes the tool head 52 axially so that the rollers 66 make frictional driving contact with the inside surface of the case 27. This results in a radial self-adjustment feature of each roller 66 and allows for equal pressure on the driving surfaces of the rollers 66, even though wear on the rollers 66 has progressed or manufacturing tolerances have been accumulated. This also facilitates assembly of the case 27 over the rollers 66.

In the illustrated apparatus, the rollers 66 are rotatable upon the central members or axles 67, each of which has a hollow threaded bore therethrough in which is threadably received the inner end of a mounting screw 68. The heads of the screws 68 are received in countersunk openings in the flange 65. A front washer 69 is interposed between the flange 65 and each axle 67 to prevent axial displacement and to serve as pressure faces against the hubs of the rollers 66.

The opposite ends of the axles 67 are each connected to an annular clutch member 70 by means of screws 71. Washers 72 are interposed between the clutch members 70 and the adjacent ends of the axles 67 to prevent axial displacement of the rollers 66. The clutch member 70 has a frusto-conical configuration with an inlaid band of frictional material 170 and an enlarged central opening. For this purpose, the rollers 66 and the clutch member 70 are formed from a metal having an inlaid non-metallic band. The parts may be formed of other materials of suitable characteristics. The inlaid band of material 170 may be made of a suitable metallic or non-metallic material.

The rigid set of the axles 67, held at the median angle and based with the washers on milled facets on the inner faces of the head plate 63 and the clutch plate 70, is valuable in itself because of the straight steering or guidance effect of the axles 67 at the heart of each roller 66, serving to make the rollers 66 roll straight, avoiding all skew, and contributing largely to the high efficiency which is known to be true of the particular construction.

Adjacent to the clutch member 70 is a second clutch member 73 which is preferably formed of metal such as stainless steel or the like and which has its surface adjacent the clutch member 70 complementary in shape thereto. The clutch member 73 has an axially extending flange portion 173, the interior of which is provided with a screw thread cooperating with a corresponding screw thread on a portion of the periphery of the inertia member 36 so that the clutch member 73 and the inertia member 36 are connected rigidly for rotation together and the position of the clutch member 73, relative to the inertia member 36, may be adjusted by threading the one along the other.

The clutch member 73 and the inertia member 36 are held in any adjusted position by means of a socket headed set screw 74 threaded into an opening in the inertia member 36. The head of the screw 74 is received in one of a plurality of elongated slots 75 in the clutch member 73. The construction is such that, by removal of the set screw 74, the clutch member 73 may be adjusted relative to the inertia member 36 and one of the slots such as the slot 75 is aligned with the opening for the set screw 74 whereupon the set screw 74 is inserted and prevents relative rotation between the clutch member 73 and the inertia member 36.

By providing a plurality of slots 75, the clutch member 73 and the inertia member 36 may be locked together in practically any desired longitudinal relationship since the distance necessary to bring adjacent slots into alignment with the opening for the screw 74 requires only a very small longitudinal distance of movement between the members. Also, no matter where the clutch member 73 may happen to be located within its total adjustment range on the member 36, access is provided for the hexagonal wrench to reach the socket in a rotor nose set screw 79. This makes possible the adjustment of the nose portion 49 from the outside without having to disturb the clutch member 73.

The nose portion 49 is provided with a polygonal shaped central opening 78 in which a suitable tool may be inserted to rotate and, thereby, to adjust the member 48 and, hence, the portion 49 relative to the inertia member 36, thereby effecting an initial adjustment between the friction rollers 66 and the portion 49. The adjustment of the nose 49 in or out of the inertia member 36 is for the purpose of periodically extending the nose portion 49 from its innermost position when the rollers 66 are new so as to take up and compensate for the gradual diameter loss of the rollers 66 from frictional wear. The member 48 is held in this adjusted position by means of the socket headed shouldered screw 79 threaded in a radially extending threaded counterbore of the inertia member 36. The inner end of the screw 79 bears upon an insert 80 which may be formed of suitable soft material such as copper or the like and which will deform at least partially into the threads of the member 48 without injuring the member 48 when the screw 79 is tightened, thereby preventing relative movement between the member 48 and the inertia member 36. The insert 80 is disposed in a bore adjacent the threaded counterbore.

The adjustment of the member 48 relative to the inertia member 36 is initially made at the time of assembly and may be changed to compensate for roller wear. Adjustment of the pressure between the friction members of the epicyclic speed change mechanism 50 after assembly, to thereby select the amount of torque transmitted therethrough, may also be effected by loosening the screw 31, thereby releasing the clamping action of the ring 28, and then turning the case 27 relative to the flange portion 26.

Since the friction rollers 66 and the nose portion 49 have an outside tapered frusto-conical surface, this axial movement of the case 27 relative to the flange portion 26 permits a greater or lesser pressure to be exerted within the roller system during the threading phase. The extent of the adjustment of the case 27 is indicated by calibrations 32 in cooperation with the stationary indicium such as the member 33, the extent of adjustment being indicated either by counting the number of calibrations 32 which are moved past the stationary indicium 33 or by providing suitable numerals or other characters adjacent the calibrations 32 to facilitate the reading thereof.

The operation of the apparatus is as follows: It will be assumed that a tapping operation is to be effected upon a suitably prepared hole in the workpiece. The workpiece is supported in a suitable means for effecting rotation thereof as, for example, by clamping the workpiece W in the chuck of a turret lathe. The tap 22 of the desired size is then inserted in the collet 51 of the apparatus 23 and the screws 53 are tightened to cause the collet 51 to firmly engage and hold the tap 22 in place. Either prior to or subsequent to clamping the tap 22 in place, the threader 23 is supported in the turret of the turret lathe so that the tap 22 is axially aligned with the opening in the workpiece to be tapped.

The chuck and, hence, the workpiece, is now rotated by the usual power means for operating the turret lathe and the apparatus or threader 23 carrying the tap 22 is advanced toward the work by actuating the turret operating turnstile or hand lever. As the tap 22 enters the prepared opening and engages the workpiece, the rotation of the workpiece causes the tap 22 to rotate likewise since the collet 51 for the tap 22 is rotatably supported by the bearing 55. Since the tap 22 and the head plate 63 are fixed to the assembly 50, they rotate as a unit.

The assembly 50 is slid axially in the inner race of the bearing 55 until the rollers 66 engage the nose portion 49. They are pushed outwardly thereby until they also engage the inner periphery of the case 27. The axial movement of the case 27 permits a greater or lesser pressure to be exerted within the roller system, the pressure coming in the first place from the operator's longitudinal pressure of the tool against the work. Since the rollers 66 are in frictional rolling engagement with the inside of the case 27, they drive the nose portion 49 of the member 48, the member 48 and, hence, the inertia member 36, and rotate it.

It is important to note that the rollers 66 are in frictional engagement and transmitting useful driving power only as long as the operator is continuing to urge the apparatus 23 in the threading direction toward the work. In other words, the original approach engaging the tool with the work must be continued and followed up by the operator in order to continue the frictional contact between the rollers 66, case 27, and nose portion 49 which produces sufficient velocity in the rotor, i.e., storage of power, to effect removal of the tool.

It is apparent, therefore, that the mechanism 50 is epicyclic in nature with the rollers 66 constituting the planetary members and the nose portion 49 of the member 48 the sun member. At this time, the clutch members 70 and 73 have their adjacent surfaces spaced slightly with respect to each other and since the clutch members 70 and 73 are disengaged, the inertia member 36 is rotated and is accelerated by the action of the friction rollers 66 upon the nose portion 49. The inertia member 36 is rotated at a faster speed than the tap 22 because of the inherent construction of the threader which, in effect, transmits power by means of a planetary system with fixed ring gear (case 27), driven planet carrier (head plate 63), and drive from sun gear (nose portion 49).

Due to the construction of the apparatus and the weight of the inertia member 36, a substantial part of the rotational energy imparted to the tap 22 by the workpiece is employed in producing rotation of the inertia member 36 and, hence, the rotation of the tap 22 is slowed or retarded with respect to the speed of rotation of the workpiece, thereby causing relative rotation between the workpiece and the tap 22 so that the machining operation of tapping the workpiece is effected and, at the same time, the inertia member 36 is accelerated and energy stored therein.

As soon as the work has been tapped to the desired depth and/or sufficient energy has been stored in the inertia member 36, the actuation of the turnstile of the turret lathe is terminated in the tap advancing direction and the turnstile is then operated in the reverse direction. Since the tap 22 is now engaged in a threaded opening in the workpiece and the cylindrical portion 24 of the apparatus 23 is firmly gripped by the turret, this actuation of the turret turnstile in moving the apparatus 23 and the tap 22 axially in a direction to withdraw the tap from the work results in sufficient axial shift of the tap and the epicyclic speed change mechanism 50 relative to the inertia member 36 so that the friction rollers 66 lose their driving relationship with the nose portion 49 and the inside of the case 27.

Simultaneously therewith, the clutch members 70 and 73 are brought into engagement with each other. Consequently, the energy which has been stored as energy of rotation in the inertia member 36 during or after the tapping operation is now transmitted from the inertia member 36 through the clutch members 70 and 73, screws 71, axles 67, screw 68 to the head plate 63 and thence to the tap 22. The clutches 70 and 73, therefore, provide a direct coupling of the inertia member 36 to the tap 22 so that the tap is rotated in the same direction but at a faster speed than that of the work since it will be remembered that the inertia member 36 has been brought up to a speed in excess of that of the work by the acceleration effect of the mechanism 50. Consequently, as the turret lever is actuated in the direction to draw the tap 22 from the work, the tap 22 is unthreaded from the tapped opening, the energy for effecting this unthreading of the tap 22 from the work having been derived from the work during the tapping operation and stored in the inertia member 36 as previously mentioned.

A new tapping operation may be immediately initiated by simply reversing the direction of actuation of the turnstile to effect re-engagement of the tap 22 with a new opening to be tapped. The initial engagement of the tap 22 with the work will cause sufficient axial shifting within the apparatus 23 to disengage the clutch members 70 and 73 and establish driving relationship between the rollers 66, the nose portion 49, and the case 27 so that the inertia member 36 is again accelerated through the epicyclic speed change mechanism 50 by energy derived from rotation of the work, a portion of which energy is therefore stored as energy of rotation by the inertia member 36. A tapping operation can, therefore, be effectively performed by means of the disclosed method and apparatus upon a rotating workpiece without the necessity of slowing, stopping, or reversing the rotation of the workpiece, with an obvious increase in efficiency of operation and saving of time.

When operating with taps or other tools of different sizes and/or upon workpieces of different materials or running at different speeds, it is desirable to adjust the torque which is transmitted from the tap to the inertia member. This is effected by adjusting the degree or percent of slippage between the friction members of the speed change mechanism. This adjustment is effected, as previously mentioned, by loosening the clamping ring 28 and turning the case 27 relative to the flange portion 26, the extent of turning being determined by the relative position of the calibrations 32 with respect to the indicium 33. After adjustment, the clamping ring 28 is again tightened. It will be readily apparent that in place of the tap 22, any tool suitable for a threading-unthreading operation may be employed such as a button or acorn die, as may other suitable tools for effecting other threading-unthreading operations of similar nature.

Although the apparatus and method have been described particularly with reference to the utilization of a turret lathe for rotating the workpiece and for providing the axial movement for the novel apparatus, it will be apparent that machine tools other than the turret lathes may be utilized. The machine is also useful in hard materials for grinding screw threads. While the apparatus, in its present preferred form, has been illustrated and described in very complete detail, it will be apparent that the method may be effected by apparatuses constructed otherwise than as herein shown and described and the apparatus itself may be formed of a variety of materials other than those specifically mentioned. Furthermore, variations may be made in shape and dimension of parts of the apparatus without departing from the basic principle of the invention. The invention is, therefore, not to be considered as limited to the exact steps of procedure and details of construction heretofore specifically described but only as required by the spirit and scope of the claims.

The embodiments of the invention in which an exclusive property or privilege is claimed are defined as follows:

What is claimed is:

1. A method of effecting a machining operation on a workpiece comprising rotating said workpiece, providing a tool supported for rotation, engaging said tool with said workpiece to be machined and absorbing energy in said tool from said workpiece and storing said energy, effecting the rotation of said tool so that said tool rotates in the same direction relative to said workpiece but at a slower rate and utilizing some of said stored energy to subsequently rotated said tool at a faster rate than said workpiece in the same direction.

2. A method of effecting a machining operation on a workpiece comprising rotating said workpiece, providing a tool supported for rotation, engaging said tool with said workpiece so that said tool is rotated by energy derived solely from rotation of said workpiece, storing at least a portion of the rotational energy imparted to said tool in an inertia member, thereby causing said tool to rotate at a slower speed than said workpiece so that said tool effects a machining operation on said workpiece, and subsequently utilizing said stored energy to rotate said tool at a faster rate than said workpiece in the same direction.

3. A method of effecting a machining operation on a workpiece comprising rotating said workpiece, providing a tool supported for rotation, engaging said tool with said rotating workpiece so that said tool is rotated by said workpiece and in the same direction, storing as potential energy of rotation in an inertia member a part of the rotational energy imparted to said tool, thereby causing said tool to rotate at a slower speed than said workpiece and effect a machining operation thereon, and then returning to said tool at least a part of the stored rotational energy after the machining operation is completed to effect rotation of said tool at a faster rate than said workpiece to effect disengagement of said tool from said workpiece.

4. A method of tapping an opening in a workpiece comprising rotating said workpiece, providing a tap supported for rotation, engaging said tap with said opening in said workpiece so that said tap is rotated by energy derived from rotation of said workpiece, storing at least a portion of the rotational energy imparted to said tap in an inertia member so that said tap rotates at a slower speed than said workpiece and taps said workpiece, discontinuing the storing of the said part of the rotational energy imparted to said tap when the tapping operation is completed, and then returning to said tap at least a part of the stored energy in a manner to cause said tap to rotate at a faster speed than said workpiece, thereby effecting disengagement of said tap therefrom.

5. An apparatus for effecting a machining operation on a rotating workpiece comprising means to receive and grip a tool, means rotatably supporting said tool gripping means, an energy storing means, first means to operatively connect said tool to said energy means, means for storing a part of the energy delivered to said tool whereby engagement of said tool with said rotating workpiece causes said workpiece to rotate said tool, the speed of rotation of said tool being less than the speed of said workpiece due to the reaction of said energy storing means on said tool so that the relative rotation between said tool and said workpiece effects a machining operation upon said workpiece, and second means to disconnect said first connecting means from said tool and to connect said tool to said energy storing means and to speed up the rotation of said tool beyond the speed of rotation of said workpiece so as to effect withdrawal of said tool and to further rotate said tool.

6. An apparatus for effecting a machining operation on a rotating workpiece comprising means to receive and grip a tool, means rotatably supporting said tool gripping means, inertia means, means operatively connecting said inertia means to said tool gripping means to rotate therewith whereby engagement of said tool with said rotating workpiece causes said workpiece to rotate said tool and said inertia means, said inertia means acting to partially retard rotation of said tool so that said tool rotates at a slower speed than said workpiece, thereby effecting a machining operation upon said workpiece, and second means to connect said tool to said inertia means when said first connecting means is disengaged for driving said tool by said inertia means at a higher speed than the speed of rotation of said workpiece.

7. An apparatus for effecting a machining operation on a workpiece comprising means to rotate a tool and a workpiece relative to each other, means to receive and grip said tool, means rotatably supporting said tool gripping means, an inertia means supported for rotation, and speed change means operatively connecting said inertia means to said tool gripping means to transmit rotation from said tool gripping means to said inertia means with a change of speed whereby engagement of said tool with said workpiece rotates said tool and said inertia means relative to said workpiece, said inertia means and said speed change means acting to partially change rotation of said tool so that said tool rotates relative to said workpiece, thereby effecting a machining operation upon said workpiece, said speed change means being actuated to rotate said tool by said inertia means at a greater speed than when said tool is rotated by said workpiece to effect withdrawal of said tool from said workpiece.

8. An apparatus for effecting a machining operation on a rotating workpiece comprising means to receive and grip a tool, means rotatably supporting said tool gripping means, an inertia means supported for rotation, speed change means operatively connecting said inertia means with said tool gripping means so that engagement of said tool with said rotating workpiece produces rotation of said tool and said tool drives said inertia means at a faster speed than that of said tool, said inertia means and said speed change means reacting upon said tool to cause said tool to rotate at a slower speed than that of said workpiece, and means forming a part of said speed change means selectively operable to provide a direct coupling of said inertia means with said tool whereby the rotational energy acquired by said inertia means is imparted to said tool to rotate said tool at a speed faster than that of said workpiece.

9. The apparatus recited in claim 8 wherein said speed change means comprises an epicyclic train having the driving and driven portions thereof connected respectively to said tool gripping means and said inertia means with the effective diameter of said driving portion greater than that of said driven portion.

10. An apparatus of the character described comprising a casing, a tool holding chuck rotatably journalled in said casing, an inertia member journalled for rotation in said casing, inertia actuated speed change means including one portion connected for rotation with said chuck and another portion cooperating with said inertia member to rotate said inertia member at a faster speed than that of said chuck, and clutch means for selectively coupling said inertia member with said one portion of said speed change means to effect a direct coupling of said inertia member to said chuck.

11. An apparatus of the character described comprising a casing, a tool holding chuck rotatably journalled in said casing, an inertia member journalled for rotation in said casing, friction members operatively connecting said chuck and said inertia member to rotate said inertia member at a faster speed than that of said chuck by rotational energy applied to said chuck, and clutch means for selectively directly coupling said inertia member to said chuck.

12. The apparatus as recited in claim 11 wherein means is provided for adjusting the position of said friction members relative to each other to compensate for wear of said friction members.

13. An apparatus of the character described comprising a hollow casing, a tool holding means rotatably journalled in said casing, an inertia means journalled for rotation in said casing, an epicyclic speed change mechanism including a plurality of planetary members supported for rotation with one of said means and relative thereto and adapted to have their peripheries in simultaneous engagement with driving means on the interior of said casing and in engagement with a portion of the other of said means to rotate said inertia means at a faster speed than that of said tool holding means, and means for selectively disengaging said epicyclic mechanism from engagement with said driving means and directly coupling said inertia means to said tool holding means.

14. An apparatus as recited in claim 13 wherein said planetary members are friction rollers.

15. The apparatus recited in claim 14 wherein means is provided to adjust the torque position of said friction rollers relative to said driving means.

16. A machine comprising means to support and rotate a workpiece, means to rotatably support a tool, means for producing relative movement between said tool and said workpiece to effect engagement of said tool with said workpiece so that said tool is rotated solely by energy derived from said workpiece, means to partially retard the rotation of said tool relative to that of said workpiece, thereby causing relative rotation therebetween so that said tool effects a machining operation on said workpiece, and inertia means on said machine having means for receiving energy from said tool whereby said inertia means is accelerated, thereby storing energy therein, and means on said machine for absorbing said stored energy for subsequently rotating said tool independent of the rotation of said means for producing relative movement of said tool and said workpiece to rotate said tool in the same direction as said workpiece at a faster rate than said workpiece.

17. A machine tool comprising means to support and rotate a workpiece, means to rotatably support a tool coaxially with respect to said workpiece, means for producing relative axial movement between said tool and said workpiece to effect engagement therebetween so that said tool is rotated solely by energy derived from said workpiece, an inertia member, speed change means operatively connecting said inertia member with said tool supporting means, said speed change means including a means to cause said inertia member to rotate at a speed faster than that of said tool with said speed change means and said inertia member reacting upon said tool to cause it to rotate at a slower speed than that of said workpiece, and means forming a part of said speed change means and selectively operable to provide a direct coupling of said inertia member with said tool supporting means to thereby impart the rotational energy of said inertia member to said tool and thus rotate said tool at a speed faster than that of said workpiece.

18. A screw threading machine comprising a chamfered support having an internal peripheral track and mounted for back and forth movement toward a workpiece, a tool holder rotatable therein, an energy storing means having a driving member and a driven member coaxially arranged with each other and with said tool holder, a speed increasing transmission operatively connected to said tool holder for being driven thereby and operating on said internal track and on said driven member for storing up energy in said means by and during threading operation on said workpiece, and means operable by and during the retracting movement of said support for disconnecting said transmission from said driven member and operatively connecting said driving member to said tool holder for operating said tool holder by the stored up energy in said means whereby said tool holder is rotated in the same direction as said workpiece at a faster rate.

19. A screw threading machine comprising a rotatable work holder, a rotatable tool holder mounted for movement toward and from said rotating work holder, inertia energy storing means operatively connected to said tool holder, means actuating said energy storing means by energy derived from said work holder upon movement of said tool holder in a direction for threading a workpiece when a tool in said tool holder engages work adapted to be rotated by said tool holder, and means operable by and upon retracting movement of said tool holder from said workpiece for operatively connecting said tool holder to said energy storing means for being operated by the stored up energy in said energy storing means for accelerating the speed of rotation of said tool holder above that of said rotating work holder whereby withdrawal of said threading tool from said workpiece is effected.

20. A screw tapping machine having a work rotating member, an opposed member for holding a threading tool, inertia energy storing means actuated from said work rotating member through said tool holding member during the threading of said work member, and speed changing means operable at the conclusion of the threading operation to connect said energy storing means to said tool holding member for driving said tool holding member at a rotational speed above that of said work rotating member.

21. A threading device comprising a hollow casing having an inner peripheral surface thereon, means to support said casing on a machine having a work support rotated relative to said means to support said casing, a tool head, means to rotatably support said tool head in said casing, means to support a threading tool on said tool head, planetary members supported on said tool head, said planetary members disposed in driving relation with said inner surface on said casing, an inertia member rotatably supported in said casing, a nose piece on said inertia member, said tool head being axially slidable to a first position to bring one part of said planetary members into driving engagement with said inner surface of said casing and into driving engagement with said nose piece whereby said inertia member is accelerated by energy transmitted thereto from said tool when said tool engages work, driving said tool relative to said work at a first speed, said tool head being slidable to a second position to disengage said planetary members from said nose piece, and means to operatively connect said inertia member to said tool head whereby said tool head is driven by said inertia member at a rate faster than the rate of rotation of said work for withdrawal of said tool from said work.

22. The threading device recited in claim 21 wherein said planetary members are supported on said tool head by means of axles received in oversized bores in said planetary members, and said nose piece has means thereon to force said planetary members outwardly into engagement with said inner surface when said tool head is moved to said first position.

23. The threading device recited in claim 22 wherein said means on said nose piece comprises a frustum conical surface on the outer surface thereof.

24. The threading device recited in claim 22 wherein said inner surface on said casing is cylindrical and said nose piece is disposed concentric to said cylindrical surface.

25. The device recited in claim 24 wherein said means on said inertia member to connect it to said tool head when said tool head is in said second position comprises a clutch member on said inertia member engageable with a clutch member on said tool head to form a direct drive therebetween.

26. The device recited in claim 24 wherein said inertia member is made of sintered tungsten.

27. The threading device recited in claim 24 wherein said planetary members comprise rollers having an outside peripheral frustum conical surface.

28. The device recited in claim 27 wherein said rollers are supported on axles and said axles are disposed at an angle of lesser magnitude than the angle of a line through the surface of said nose piece and in a common plane with the axis thereof.

29. A threading device comprising a hollow casing having a cylindrical inner periphery, means to support said casing on a machine having a work support rotated relative to said means to support said casing, a tool head, an inertia member disposed in said casing and freely rotatable relative about a common axis, planetary rollers on said tool head spaced adjacent said inner periphery, an axially extending nose having a frustum conical outer peripheral surface disposed concentric to said cylindrical periphery and disposed adjacent said rollers, said tool head slidable axially in said casing, and a threading tool on said tool head engageable with work, bringing said rollers into engagement with said nose whereby said rollers are forced into engagement with said cylindrical periphery, said rollers rolling on said inner periphery and driving said nose and said inertia member to accelerate said inertia member, said tool head being slidable to a second position to disengage said nose from said rollers and to engage a clutch on said inertia member with clutch means on said tool head to drive said tool head from said inertia member by inertia stored therein in the same direction at a faster rate to effect withdrawal of said tool from said work.

30. The device recited in claim 29 wherein said clutch means on said inertia member is adjustable toward said tool head.

31. A threading device comprising means on said device to support a tool thereon, means on said device to bring said tool into engagement with a rotating workpiece, means on said device connecting said tool to an inertia energy storing means whereby the inertia of said energy storing means retards rotation of said tool and said tool transmits a portion of the energy transmitted thereto from said rotating workpiece to said inertia member, and means on said device to release the energy stored in said inertia member to drive said threading tool at a rate faster than the rate of rotation of said workpiece for withdrawal of said tool from said workpiece.

32. An attachment for a machine tool for threading and unthreading operations, said attachment having means thereon to support it on said machine tool, means to rotate a workpiece relative to said attachment, a tool supported on said attachment, said tool being relatively rotatable on said attachment, and inertia energy storing means for storing energy from said workpiece in said attachment for unthreading said tool from said workpiece by rotating said tool at a rate faster than the rate of rotation of said workpiece and in the same direction.

33. The attachment recited in claim 32 wherein said means in said attachment is actuated when said tool is stopped against advance into said workpiece.

References Cited in the file of this patent

UNITED STATES PATENTS

| 905,991 | Curtis | Dec. 8, 1908 |
| 2,389,998 | Rosenthal | Nov. 27, 1945 |
| 2,525,946 | Roberts | Oct. 17, 1950 |
| 2,538,548 | Zimmerman | Jan. 16, 1951 |
| 2,708,277 | Holt | May 17, 1955 |